United States Patent [19]

Iwata et al.

[11] 4,336,985
[45] Jun. 29, 1982

[54] CAMERA WITH MACRO-PHOTOGRAPHIC SYSTEM

[75] Inventors: Hiroshi Iwata, Nara; Tetsuo Yamaoka; Akitoshi Morioka, both of Osaka, all of Japan

[73] Assignee: West Electric Co., Ltd., Osaka, Japan

[21] Appl. No.: 249,884

[22] Filed: Apr. 1, 1981

[30] Foreign Application Priority Data

Apr. 10, 1980 [JP] Japan ................... 55-47870

[51] Int. Cl.³ .................. G03B 3/00; G03B 15/05
[52] U.S. Cl. .................................. 354/145; 354/197; 354/221
[58] Field of Search ............... 354/126, 129, 145, 150, 354/195, 197, 221, 222

[56] References Cited

U.S. PATENT DOCUMENTS 3,836,934  9/1974  Suzuki et al. ................ 354/197
4,171,887 10/1979  Hayata ....................... 354/221 X

FOREIGN PATENT DOCUMENTS 2740929  3/1979  Fed. Rep. of Germany ...... 354/197

Primary Examiner—John Gonzales
Attorney, Agent, or Firm—Burgess, Ryan and Wayne

[57] ABSTRACT

A camera which has a macro-photographic optical system for taking the magnified picture of a minute object or specimen, a first viewfinder system for permitting to view the magnified image of the object or specimen in the case of macro-photography, an illumination source for illuminating the object or specimen in the case of macro-photography, a normal or standard photographic optical system for taking the standard picture of a subject or object, a second viewfinder system such as an inverted Galilean finder used in the case of standard photography and an electronic flash. The selection of the macro-photographic mode or the standard photographic mode can be accomplished only by shifting a single optical element; that is, a reflecting mirror mounted in a mirror box.

The camera has such a superior feature that the camera is very simple in construction yet capable of highly effective results in practice while in the case of macro-photography, a specimen can be clearly viewed and sharply focused.

10 Claims, 5 Drawing Figures

4,336,985

CAMERA WITH MACRO-PHOTOGRAPHIC SYSTEM

BACKGROUND OF THE INVENTION

There is a camera capable of both macro- and standard photography as disclosed in U.S. Patent application Ser. No. 181,071, West German Patent Application No. P 3032873.5 and British Patent Application No. 8027199.

The camera disclosed in the above-described patent applications comprises in general a macro-photographic system optically coupled to a first light aperture formed through the front wall of a camera body, a standard photographic system optically coupled to a second light aperture formed through the front wall of the camera body, a photographic system selection means in which optical elements including at least one of said first and second lenses are moved for selecting either the macro- or standard photographic system, a first viewfinder system which is used in the case of macro-photography and which is optically coupled to the macro-photographic system and to a first viewing aperture formed through the rear wall of the camera body, a second viewfinder system which is used in the case of standard photography and which may be optically coupled to the standard photographic system and to a second viewing aperture formed through the rear wall of the camera body, a luminous source disposed within the camera body for illuminating a specimen in the case of macro-photography, and an electronic flash disposed in the camera body for lighting an object or subject. However, this camera has the drawback that when the photographic system selection means is shifted, the macro- or standard lens system is shifted over a relatively greater distance, so that it is difficult to maintain the macro- or standard photographic system in a correct position with a higher degree of accuracy. In addition, it has the drawbacks that an optical system which must be shifted for selecting the macro- or standard photographic mode is large in size and a mechanism for shifting such shifting optical system is very complex in construction. As a result, the camera is large in size and is expensive to manufacture.

SUMMARY OF THE INVENTION

The camera in accordance with the present invention has a camera body which incorporates therein a macro-photographic optical system for taking the magnified picture of a minute object or a specimen, a first viewfinder for permitting an operator to view the magnified image in the case of macro-photography, a standard photographic optical system, a second viewfinder system such as an inverted Galilean finder used in the case of standard photography and a selecting means for selecting either the macro- or the standard photographic mode.

The present invention has for its primary object to provide a camera capable of standard and macro-photography which is simple in construction, compact in size, light in weight, easy to operate and inexpensive to manufacture.

Another object of the present invention is to simplify the manufacturing steps of the cameras of the type described above by reducing the optical system which is shifted for selecting either the macro- or standard photographic mode to only a single optical element; that is, a reflecting mirror.

A further object of the present invention is to provide a transparent hood which is used in the case of macro-photography so as to place a specimen in such a position that it can be clearly viewed and sharply focused.

The above and other objects, effects and features of the present invention will become more apparent from the following description of a preferred embodiment thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENT

Figure 1A:
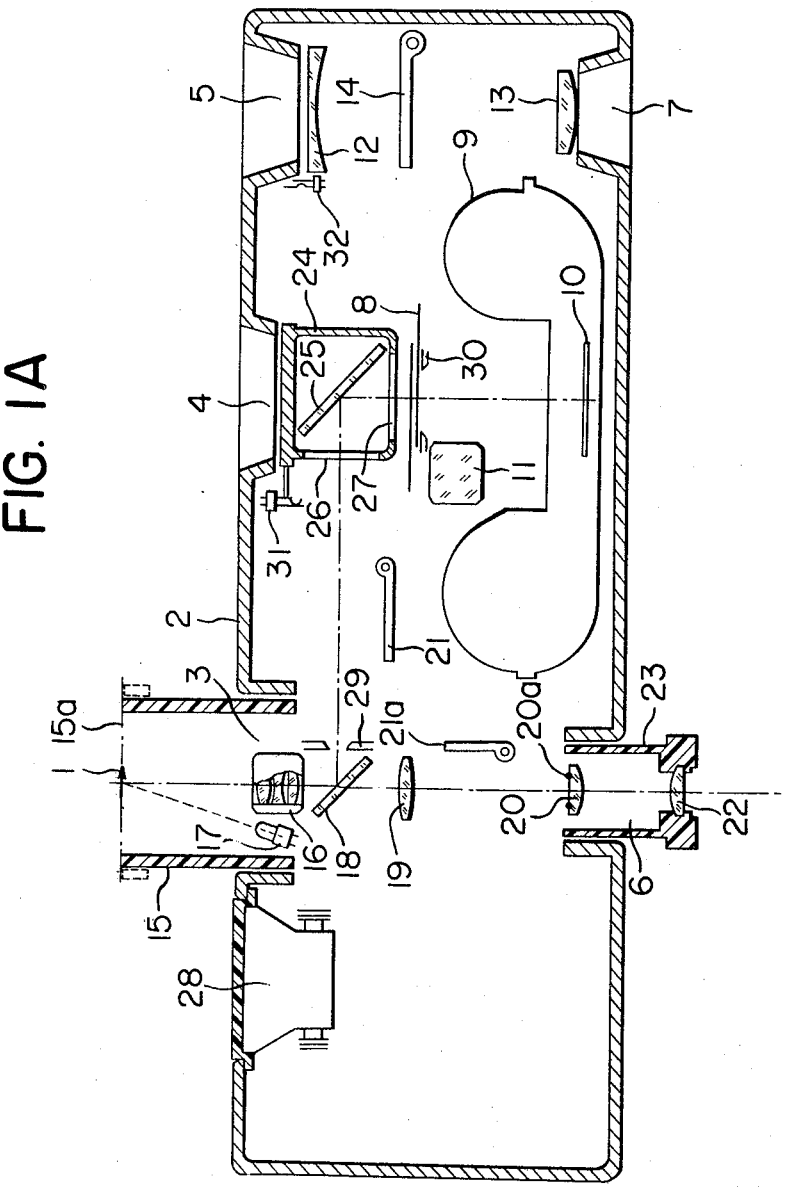
FIG. 1A is a sectional view of a camera in accordance with the present invention which is set to the macro-photographic mode.
Figure 1B:
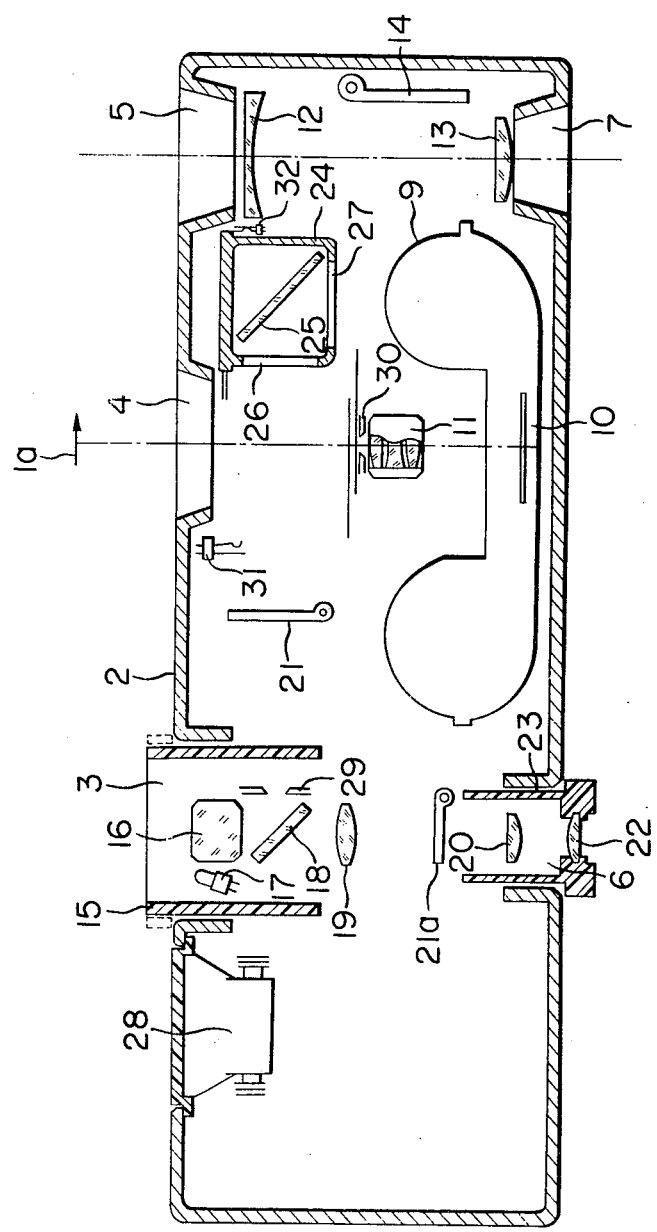
FIG. 1B is a view similar to FIG. 1A but shows that the camera is set to the standard photographic mode.

Referring to FIGS 1A and 1B, reference numeral 1 or 1a designates a specimen or an object; 2, a camera body; 3, a first light aperture for admitting the light rays from the specimen 1; 4, a second light aperture; 5, a third light aperture; 6, a first viewing aperture; 7, a second viewing aperture; 8, a shutter mechanism; 9, a cartridge loaded with a 110-film; 10, a film plane; 11, a standard lens; 12, a first objective lens of the standard viewing system; 13, a first eyepiece thereof; 14, a first light shielding plate for preventing the light rays from entering the camera body 2 through the third light aperture 5; 15, a transport cylindrical hood which can be extended out of the camera body 2 so that the specimen 1 can be located at a predetermined distance away from the camera by body for macro-photography; 16, a macro- or magnifying lens which also serves as a second objective lens of the macro- or magnifying viewing system; 17, a luminous source for illuminating the specimen 1 for macro-photography, the luminous source being, for instance, a tungsten-filament lamp; 18, a half-mirror; 19, a lens for shortening the optical path; 20, a condenser lens; 21 and 21a, a second and a third light shielding plate for shielding the light ray admitted through the first light aperture 3 and the macro- or magnifying lens 16; 22, a second eyepiece of the macro- or mangified viewing sytem; 23, a lens barrel for the eyepiece 22; 24, a marror box with a reflecting mirror 25 and a first light aperture 26 and a second light aperture 27; 28, a built-in electronic flash which can be flashed in both the normal and macro-photographic modes as needs demand; 29, a diaphragm or stop for the macro-photographic system; 30, a diaphragm or stop for the normal photographic system which is controlled in response to the displacement of the mirror box 24; 31 and 32, a first switch and a second switch which are turned on or off in response to the displacement of the mirror box.

Next, referring to FIG. 1A, the macro-photographic mode will be described. The hood 15 is extended out of the camera body 2 so that the specimen 1 to be observed or photographed is in coplanar relationship with the outer end 15a of the hood 15. The light rays from the specimen 1 are admitted through the first light aperture 3 into the macro-lens 16 which also serves as the objective lens of the macro- or magnified viewing system. The light rays emerging from the macro-lens 16 are reflected by the half-mirror 18 toward the reflecting mirror 25 in the mirror box 24 through the diaphragm 29 and the first aperture 26 of the mirror box 24. The light rays are then redirected by the reflecting mirror 25 through the second aperture 27 of the mirror box 24 toward the shutter mechanism 8. When the shutter mechanism 8 is opened for exposure, the light rays are then transmitted through the shutter mechanism 8 and the diaphragm 30 and focused on the film plane 10 in the cartridge 9. The image of the specimen 1 focused is magnified by a predetermined magnification. In this case, the diaphragm 30 is kept wide opened, as will be described in detail below, so that all of the light rays reflected by the reflecting mirror 25 reach the film plane 10.

The transparent cylindrical hood 15 has been described as being extended out of the camera body 2 so as to correctly maintain the distance between the specimen 1 and the macro-lens 16. However, when the specimen 1 is clamped between a glass slide and an overslip, it now has some thickness. As a result, when it is desired to focus the front part closer to the lens 16 or intermediate portion of the specimen 1, it is impossible to sharply focus it even when the transparent cylindrical hood 15 is exended correctly by a predetermined distance out of the camera body.

Meanwhile, it is well known in the art that the macrolens 16 may be shifted along its optical axis so that a desired portion of the specimen 1 may be sharply focused. However, the higher the magnifying power of the macro-lens 16, the greater the displacement becomes. As a result, the camera body must be increased in size and consequently the camera cannot be made compact in size. Therefore, according to the present invention, a helicoid mechanism (not shown) is used to shift the transparent cylindrical hood 15 toward or away from the specimen 1, so that a desired portion or section thereof can be sharply focused without shifting the macro-lens 16. Thus, according to the present invention, the camera body 2 can be made into compact in size and specimens in various positions or postures can be easily focused.

In general, the axial shift of the transparent cylindrical hood 15 by the helicoid mechanism is accompanied with the rotation thereof. As a result, the specimen 1 may be rotated in unison with the hood 15. Therefore, the present invention provides a means which will prevent the rotation of the hood 15 to the specimen 1 or a slide mounting it. That is, as shown by the broken lines in FIG. 1A, a ring or the like which has the outer end adapted to position the specimen 1 or the slide mounting it is fitted over the hood 15 in such a manner that the ring or the like will not rotate in unison with the hood 15. Thus, the macro-photography can be much facilitated.

In FIG. 1A, the hood 15 is shown as being extended out of the camera body 2 or retracted therein, but it is to be understood that the hood 15 may be detachably attached to the first light aperture 3 with a suitable mounting means. Furthermore, the hood 15 is not limited to a cylindrical shape and may be in any suitable shape such as a frustoconical shape.

Next, the macro- or magnified viewing system for macro-photography will be described. Part of the light rays incident on the half-mirror 18 is transmitted therethrough and passes through the lens 19 so as to be focused on one face 20a of the condenser lens 20. One can view a magnified image of the image focused on the face 20a of the condenser lens 20 through the eyepiece 22 which is mounted in the lens barrel 23 which in turn is slidably fitted into the first viewing aperture 6. As a result, as with the single lens reflex camera, one can view the image without any parallax and when the lens barrel 23 is extended out of or retracted into the camera body 2, one can clearly view the magnified image and can also adjust the angle of view of the magnified image focused on the face 20a of the condenser lens 20.

Next, still referring FIG. 1A, the mode of operation of the light shielding plates 14, 21 and 21a will be described. They are operatively connected to the mirror box 24 through coupling means (not shown) so that their positions may be controlled in response to the position of the mirror box 24. That is, in the case of the macro-photographic mode, the first light shielding plate 14 is inserted into the normal viewing system comprising the objective lens 12 and the eyepiece 13 so that the normal viewing system is maintained in the "inoperative" mode. The second light shielding plate 21 is retracted away from the macro-photographic system while the third light shielding plate 21a is retracted from the macro- or magnified viewing system.

The flash exposure in the case of the macro-photogrpahy will be described in detail below.

Next, referring to FIG. 1B, the normal photographic mode will be described in detail. By means of a mode selection knob or the like 43 (See FIG. 4), the mirror box 24 is shifted from the position shown in FIG. 1A to the position shown in FIG. 1B. As a result, the diaphragm or stop 30 for the normal photographic system is rendered operative; the standard lens 11 is shifted from its inoperative position to the operative position immediately behind the diaphragm 30; the first light shielding plate 14 is retracted away from the normal viewing system; and the second light shielding plate 21 is inserted into the macro-photographic system while the third light shielding plate 21a is inserted into the macro- or magnified viewing system. As a result, the macro-photography system as well as the macro- or magnified viewing system are rendered inoperative. The hood 15 and the lens barrel 23 are pushed into the camera body 2. They are provided with click means so that when they are extended out of the camera body 2 or pushed into it, one may feel "click" actions. In the case of the detachable hood, it may be detached out of the camera body 2.

The light rays from the subject 1a are admitted through the second light aperture 4 to the shutter mechanism 8. When the shutter mechanism 8 is opened, they are focused through the diaphragm 30 and the standard lens 11 on the film plane 10 in the cartridge 9.

The normal viewing system comprises the third light aperture 5, the objective lens 12, the eyepiece 13 and the viewing aperture 7.

Next, the flash exposure in normal or macro-photography will be described. In the case of the normal photographic mode, the electronic flash 28 may be used and in the case of the macro-photographic mode, first the luminous source 17 is turned on to illuminate the specimen 1 so that the latter may be clearly viewed and sharply focused and the electronic flash 28 is flashed for macro-photography.

In the case of macro-photography, if the specimen is not illuminated, one can see only a dark image especially of the construction of the macro-lens 16. Therefore, the illumination of the specimen with the luminous source 17 helps one clearly view and sharply focus the specimen. Furthermore, in a dark environment the illumination of the subject or object is also effective.

Figure 2:
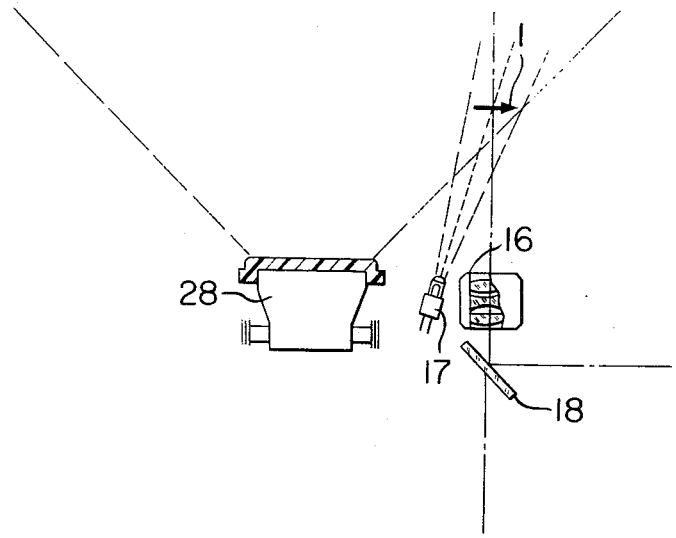
FIG. 2 is a view used for the explanation of a luminous source and an electric flash thereof.

The electronic flash 28 is so disposed that the specimen 1 can be exposed to a flash of light as shown in FIG. 2. The luminous source 17 is also disposed adjacent to the optical axis of the macro-lens 16 so as to effectively illuminate the specimen 1 so that one can view a brightly illuminated image. In the case of the normal or standard photographic mode, the axis of the electronic flash 28 is spaced apart from that of the standard lens 11 by a suitable distance as shown in FIG. 1B so that no red-eye phenomenon will result.

As described above, the electronic flash 28 is flashed in both normal and macro-photography when so required. However, when the electronic flash 28 is flashed at its full capacity regardless of the speed of a film used, overexposures will result especially with a high-speed film.

There has been well known in the art that the diaphragm aperture of a photographic system is controlled in order to prevent overexposures. Therefore, it is preferable that the camera in accordance with the present invention be so arranged as to control the diaphragm aperture in response to the speed of a film used.

However, in practice, it is extremely difficult to use a common diaphragm for both normal and macro-photography so that as shown in FIGS. 1A and 1B, according to the present invention the diaphragm 29 for macro-photography and the diaphragm 30 for normal photography are provided separately. Therefore, when a control mechanism is provided for controlling the aperture of the diaphragm 29 or 30 in response to the speed of a film used, the exposure compensation can be accomplished in a simple manner, but there arises the problem that such control mechanism is very complex in construction.

Therefore, according to the present invention, only the diaphragm 30 for the normal photographic system is coupled to a control system which is simple in construction and which is adapted to control the aperture of the diaphragm 30 in response to the speed of a film used in such a way that in the case of macro-photography, the diaphragm 29 is wide opened or maintained at a predetermined aperture. More specifically, in the case of normal photography, the diaphragm 30 is so controlled that the quantity of light incident on the film plane 10 may be controlled, but in the case of macro-photography, the quantity of light emitted from the electronic flash 28 is electronically controlled.

Various systems for controlling the diaphragm 30 are well known in the art, so that only the system for controlling the electronic flash 28 in the case of macro-photography will be described below.

Figure 3:
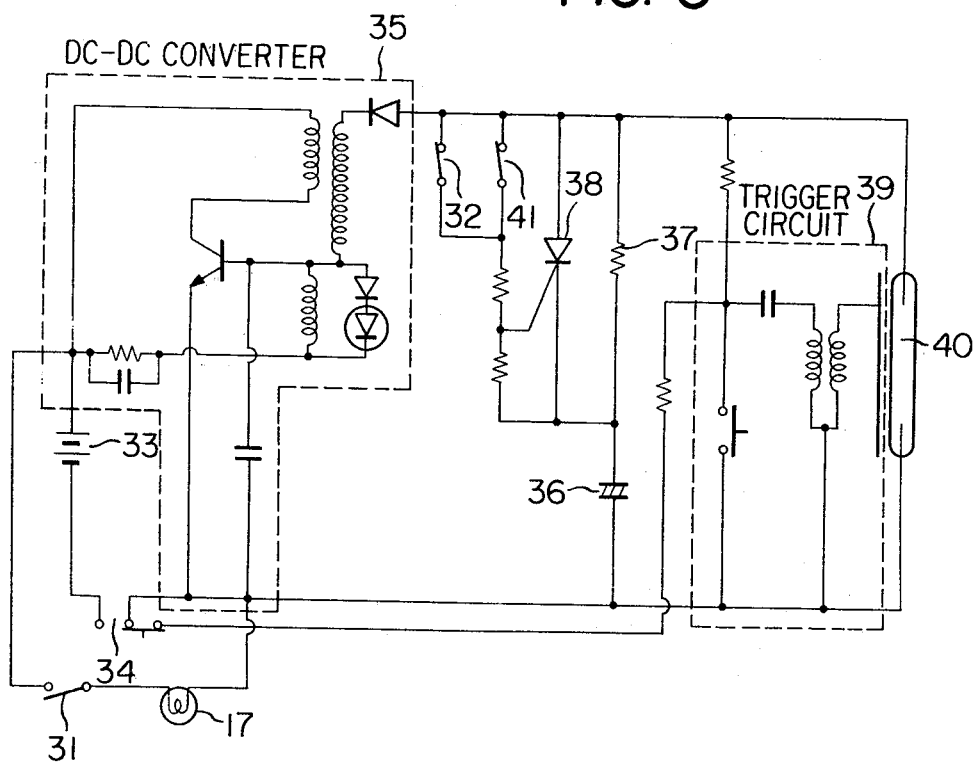
FIG. 3 is a circuit diagram thereof.

Referring to FIG. 3 showing the circuit diagram of the luminous source 17 and the flash 28, reference numeral 33 designates a power supply; 34, an on-off switch; 35, a DC-DC converter; 36, a main discharge capacitor; 37, a resistor for controlling the quantity of flash light; 38, a thyristor for controlling the quantity of flash light; 39, a trigger circuit; 40, a flash tube; and 41, a sensing switch which is controlled in response to the speed of a film used; that is, the switch which is turned off when a high-speed film is used.

As described previously, the switches 31 and 32 (See also FIGS. 1A and 1B) are controlled in response to the displacement of the mirror box 24. That is, in the case of macro-photography, the switch 31 is turned on while the switch 32 is turned off. When a low-speed film is used, the sensing switch 41 is turned on. When the on-off switch 34 is turned on under these conditions, the main discharge capacitor 36 is charged and when the flash tube 40 is triggered in response to the signal from the trigger circuit 39, the thyristor 38 is turned on, whereby a loop for discharging the main discharge capacitor 36 is established and the flash tube 40 is lighted at its full capacity.

However, when a high-speed film is used, the sensing switch 41 is turned off as described previously, so that even when the flash tube 40 is lighted, the thyristor 38 remains turned off. As a result, a loop for discharging the main discharge capacitor 36 is established through the resistor 37, so that the quantity of light emitted from the electronic flash becomes less than when the discharge loop is established through the thyristor 38.

When the on-off switch 34 is turned on, the power supply 33 is connected to the DC-DC converter 35 and since the switch 31 is turned on, the luminous source 17 is also turned on to illuminate the specimen 1.

In the case of normal photography, the switch 32 is turned on as shown in FIG. 1B, so that when the on-off switch 34 is turned on, the discharge loop through the thyristor 38 is established regardless of the fact whether the sensing switch 41 is turned on or off and consequently the flash tube 40 is lighted at its full capacity. However, the diaphragm 30 is controlled in response to the speed of a film used as described previously so that an overexposure can be avoided.

In the normal photography, the switch 31 is turned off so that even when the on-off switch 34 is turned on, the power supply 33 will not be connected to the luminous source 17 so that the latter will not be turned on. Thus, wasteful use of the power supply 33 can be avoided. If the specimen is illuminated by a separate luminous source in the case of macro-photography, the use of the electronic flash 28 is obviously not needed.

Figure 4:
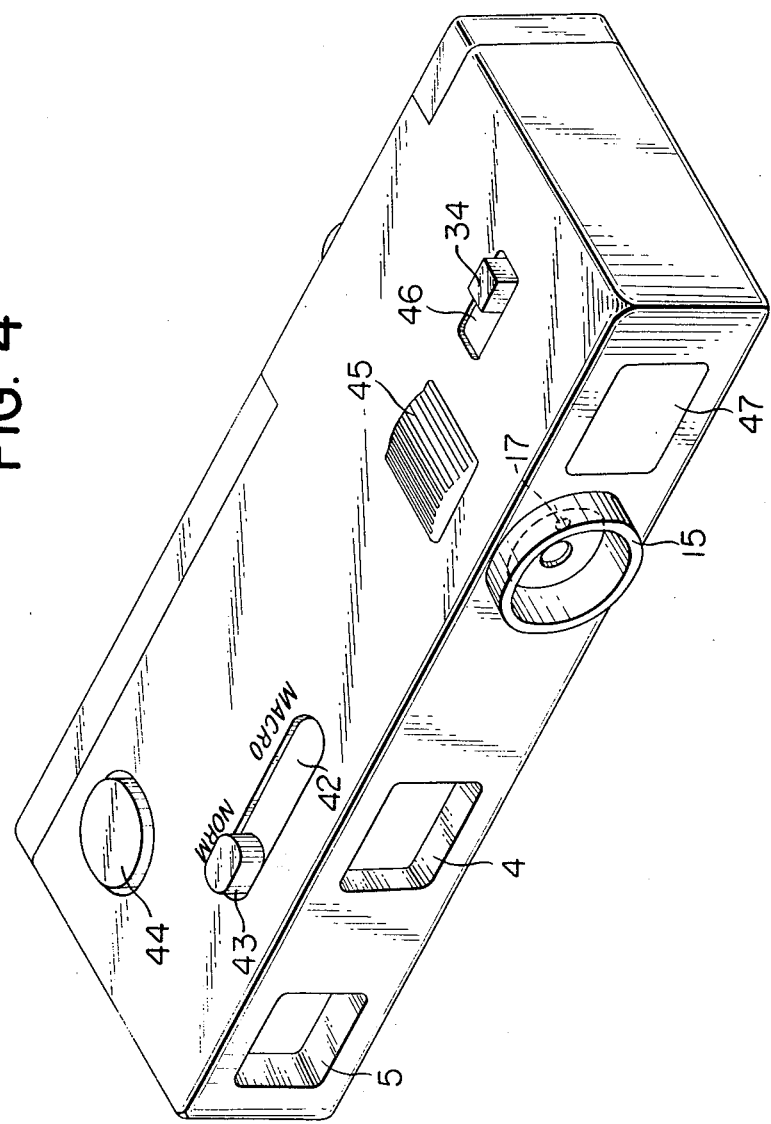
FIG. 4 is a perspective view of the camera shown in FIG. 1A or 1B.

FIG. 4 is a perspective view of the camera in accordance with the present invention. Reference numeral 42 designates an elongated slot in which slides the operation or mode selection knob 43; 44, a shutter release button; 45, a knob for adjusting the hood 15; 46, an elongated slot in which the on-off switch 34 slides; and 47, a flash light aperture of the electronic flash 28.

The mode selection knob 43 is formed integral with the mirror box 24 and extended through the elongated slot 42 beyond the top wall of the camera body 2. The mirror box 24 is provided with click spring means and stop means (both not shown) so that it can be correctly maintained in the normal or macro-photographic position. When one shifts the mode selection knob 43, the mirror box 24 is shifted to the macro-photographic position as shown in FIG. 1A or to the normal photographic position as shown in FIG. 1B.

In order to light the electronic flash 28, the power switch or on-off switch 34 in the elongated slot 46 is shifted. In the case of macro-photography, the mode selection knob 43 is operated so that the switching mechanism in the camera body 2 is actuated in the manner described previously. Further, the luminous source 17 is turned on or off by operating the on-off switch 34.

In the manner described previously, the macro- or normal photographic mode is selected and the on-off switch 34 is turned on or off so as to set or not to set the electronic flash 28 and so as to turn on or off the luminous source 17. The specimen under illumination or the subject is viewed through the macro- or magnified viewfinder system or through the normal viewfinder system and then one depresses the shutter button 44 for exposure. In the case of macro-photography, one operates the fine adjusting knob 45 so as to shift forward or back the hood 15 so as to sharply focus a desired portion of the specimen 1. At the same time, the lens barrel 23 is shifted forward or backward by a helicoid mechanism (not shown) so that one can view the image clearly.

In summary, according to the present invention, only the mirror box with only one reflecting mirror is shifted when the macro- or normal photographic mode is selected, so that the construction of the camera can be much simplified. To put it another way, both the macro- and normal photography systems can be held stationary correctly in their positions. In addition, the transparent cylindrical hood 15 and the eyepiece barrel 23 are mounted for fine axial shift or movement, so that macro-photography is much facilitated. In order to control flash exposure in both macro- and normal photography in response to the speed of a film used, an electronic means including the switch 32 which is in turn controlled in response to the displacement of the mirror box 24 and a conventional mechanical control means for controlling the aperture of the diaphragm 30 are provided independently of each other, so that the aperture control system can be much simplified in construction. Moreover, the light shielding plates are provided which are controlled in response to the shift of the mirror box 24, so that unwanted light rays will not be incident on the film plate 10. Thus, the camera with a macro-photographic system in accordance with the present inventino is very efficient in operation.

What is claimed is:

1. A camera with a macro-photographic system of the type including
a plurality of light apertures formed through a wall of a camera body for admitting the light rays from an object into the camera body,
a macro-photographic lens system optically coupled to a first one of said light apertures,
a standard photographic lens system optically coupled to a second one of said light apertures,
a lens system selection means for selecting either the macro-photographic lens or the normal photographic lens,
a first viewfinder system which is used in the case of macro-photography and which is optically coupled to the macro-photographic lens system and to a first viewing aperture formed through a wall of the camera body,
a second viewfinder system which is used in the case of normal photography and which is optically coupled to the normal photographic lens system and to a second viewing aperture formed through the wall of the camera body,
a luminous source disposed within the camera body for illuminating an object, and
an electronic flash disposed in the camera body for lighting an object,
characterized in that
said lens system selection means includes a mirror box (24) with a first light aperture through which pass the light rays emerging from the macro-photographic lens system, a reflecting mirror for totally reflecting the light rays passed through the first aperture of the mirror box and a second light aperture through which pass the light rays reflected by said reflecting mirror; and
said mirror box is selectively movable between a macro-photographic position and a normal photographic position,
said macro-photographic position being such that the mirror box permits the transmission of the light rays passed through said second light aperture of said mirror box to a shutter mechanism, but prevents the light rays passed through said second light aperture of said camera body to said normal photographic lens system, and
said normal photographic position being such that said mirror box prevents the transmission emerging from the macro-photographic lens system to said shutter mechanism, but permits the transmission of the light rays passed through said second light aperture of said camera body to said normal photographic lens system.

2. A camera with a macro-photographic system as set forth in claim 1 further characterized in that
a transparent hood is disposed in or mounted on the camera body adjacent to said first light aperture of the camera body so that an object to be photographed and viewed through said macro-photographic lens system and said first viewfinder system, respectively, can be maintained at a position spaced apart by a predetermined distance from the macro-photographic lens system.

3. A camera with a macro-photographic system as set forth in claim 2 further characterized in that
said transport hood is operatively coupled to a helicoid mechanism which in turn is coupled to an operating knob extended out of the camera body so that when the operating knob is operated, the transparent hood is finely shifted along the optical axis; and
a ring is fitted over the transparent hood in such a way that said ring is freely rotatable relative to the transparent hood, the free end of said ring being adapted to define the plane of an object.

4. A camera with a macro-photographic system as set forth in claim 2 further characterized in that
said transparent hood is so designed and constructed as to be detachably mounted on the camera body.

5. A camera with a macro-photographic system as set forth in claim 1 further characterized in that
said mirror box is operatively coupled to a first light shielding means and a second light shielding means in such a way that said first light shielding means is inserted into said second viewfinder system while said second light shielding means is retracted away from said macro-photographic lens system when said mirror box is moved to said macro-photographic position, but when the mirror box is moved to said normal photographic position said first light shielding means is retracted away from the second viewfinder system while the second light shielding means is inserted into the macro-photographic lens system.

6. A camera with a macro-photographic system as set forth in claim 1 further characterized in that
said mirror box is operatively coupled to a third light shielding means in such a way that when the mirror box is brought to the macro-photographic position, said third light shielding means is retracted away from said first viewfinder system so as to permit the observation of the image of an object therethrough, but when the mirror box is brought to said normal photographic position, said third light shielding means is inserted into the first viewfinder system.

7. A camera with a macro-photographic system as set forth in claim 1 further characterized in that
said luminous source is electrically connected to a power supply of said electronic flash through an on-off switch which controls the operation of said electronic flash and through a switch which is turned on when said mirror box is brought to said macro-photographic position.

8. A camera with a macro-photographic system as set forth in claim 7 further characterized in that
said luminous source is turned on only in the case of macro-photography.

9. A camera with a macro-photographic system as set forth in claim 1 further characterized in that
said normal photographic lens system is provided with a variable diaphragm mechanism adapted to control the quantity of light,
said macro-photographic lens system is provided with a fixed diaphragm, and
in the case of macro-photography, the quantity of light emitted from said electronic flash is varied in response to the sensitivity of a film used.

10. A camera with a macro-photographic system as set forth in claim 1 further characterized in that
an eyepiece of said first viewfinder system is mounted in a lens barrel which in turn is shiftable along the optical axis.

* * * * *